United States Patent
Chen et al.

(10) Patent No.: US 6,452,483 B2
(45) Date of Patent: Sep. 17, 2002

(54) VEHICLE SECURITY SYSTEM HAVING ADVANCED WIRELESS FUNCTION-PROGRAMMING CAPABILITY

(75) Inventors: Chau-Ho Chen, Hsing-Tien (TW); Jerry W. Birchfield, Vista, CA (US)

(73) Assignee: Directed Electronics, Inc., Vista, CA (US)

( * ) Notice: Subject to any disclaimer, the term of this patent is extended or adjusted under 35 U.S.C. 154(b) by 0 days.

(21) Appl. No.: 09/732,525

(22) Filed: Dec. 6, 2000

Related U.S. Application Data

(63) Continuation-in-part of application No. 08/790,954, filed on Jan. 29, 1997, now Pat. No. 6,184,779.

(51) Int. Cl.$^7$ ................................................. B60Q 1/00
(52) U.S. Cl. ..................... 340/425.5; 340/426; 307/10.2
(58) Field of Search ............................. 340/425.5, 426, 340/428, 429, 430, 5.22, 5.3; 307/10.2, 10.4, 10.5; 180/167, 287

(56) References Cited

U.S. PATENT DOCUMENTS

| | | | | |
|---|---|---|---|---|
| 5,146,215 A | * | 9/1992 | Drori | 340/5.22 |
| 5,650,774 A | * | 7/1997 | Drori | 340/5.22 |
| 5,917,405 A | * | 6/1999 | Doao | 340/426 |
| 6,104,783 A | * | 8/2000 | DeFino | 379/38 |
| 6,130,606 A | * | 10/2000 | Flick | 340/426 |

\* cited by examiner

Primary Examiner—Van Trieu

(57) ABSTRACT

A vehicle security system for performing selectable vehicle security functions that are programmable in a wireless manner. The system has a microcontroller controlling a vehicle security interface including at least a siren control unit and a vehicle head/signal light controlling unit. A physically independent remote programming unit is used for transmitting function-programming information to the microcontroller, and a radio receiver is connected to the microcontroller for receiving function-programming information transmitted by the remote programming unit. The remote programming unit includes a switch array for setting up a security function code pattern representing the selected security functions. The remote programming unit also includes a radio transmitter for sending, in an electromagnetic transmission, the function-programming command in a signal string representing the security function code pattern to the microcontroller. The microcontroller stores, in an onboard memory, data identifying the security functions conveyed in a security function code pattern received from the remote programming unit. The programmed functions control the various vehicle security function units. The security system provides an easy function-programming capability without having to remove any system components from the vehicle and without having to use any special and expensive additional equipment.

63 Claims, 9 Drawing Sheets

VEHICLE SECURITY SYSTEM HAVING ADVANCED WIRELESS FUNCTION-PROGRAMMING CAPABILITY

CROSS-REFERENCE TO RELATED APPLICATION(S)

This application is a continuation-in-part of U.S. application Ser. No. 08/790,954, filed Jan. 29, 1997, now U.S. Pat. No. 6,184,779.

BACKGROUND OF THE INVENTION

1. Field of the Invention

This invention relates to a security system, and more particularly, to a security system capable of having its functions wirelessly programmed without removing any of its components from a vehicle.

2. Background Art

Security systems are widely deployed for passenger vehicles, such as family sedans and vans, which represent valuable possessions for ordinary families and small businesses. A typical vehicle security system is incorporated as part of the electronic system of a vehicle and provides a selection of security functions such as intrusion alarm arming and automatic door locking. It can also serve as a user convenience system to aid in the location of a vehicle located in a crowded parking lot.

Vehicle security systems are generally classified as being either active arming or passive arming systems. In the passive arming category, there are systems with or without a door-locking function, systems with or without an arming/disarming chirp, and so on. Similar functional varieties can also be found for active arming systems. Whatever the category, it is desirable to construct the system in a way that allows the functions of the vehicle security system to be programmable by the user. A user of a vehicle security system living in an apartment, for example, may want to turn off the arming/disarming chirp, or reduce the sound level of the chirp if he frequently comes home late. The sensitivity of the intrusion alarming function may also need to be adjusted to prevent false alarms on windy days.

As a self-contained electronic system, it is desirable for a vehicle security system to be configured to conform to user decisions about which of the provided security functions should be enabled or disabled. System configuration also includes setting adjustable features, such as the chirp sound level mentioned above, which are set to levels suitable for the environment in which these systems operate. Thus, when attempting to set up, or program, the functions of a vehicle security system, the design of the interface between the security device and the user becomes important in providing a convenient, successful and efficient security device.

For the purpose of describing the invention, several prior-art vehicle security systems are briefly examined in the following paragraphs with reference to the accompanying drawings. Among the examined security systems, FIG. 1 is a block diagram illustrating the circuit configuration of a conventional system that employs a dual in-line package (DIP) switch array for programming the security functions. The systems of FIGS. 2 and 3 have basically the same circuit configuration, although they employ different function-programming methodologies.

FIG. 1 illustrates a conventional vehicle security system. It includes a microcontroller 30 that controls the security functions of a vehicle. In addition to the microcontroller, the depicted system optionally includes subsystems such as a power door-lock 31, a starter interrupt 32, a light emitting diode (LED) 33, a siren 34, a vehicle light signaling control 35, and an auxiliary output 36. All these subsystems are controlled by the microcontroller 30 for facilitating all the control and status, indicating purposes involved in the security functional operations of the system.

For example, the LED 33 is typically a subsystem installed on the dashboard to display different lighting patterns indicating to the user (the driver of the vehicle) information concerning the security system status. Additionally, if a security violation event is triggered from outside the vehicle after the security system is armed, the siren control 34 and vehicle light signaling control 35 can be activated in different sounding schemes and head/signal light lighting patterns respectively. These sound and light signals warn about the attempted or achieved intrusion into the guarded vehicle. Further, the auxiliary output 36 can be used to initiate, for example, a radio transmitting device on board the vehicle which can send predefined signal patterns for use in determining the location of the vehicle.

The system outlined in the block diagram of FIG. 1 further includes an ignition switch status indicator 21, a valet/override switch 22, a DIP switch array 23 and a radio receiver 10. The ignition switch status relayed from the indicator 21 is used by the microcontroller 30 to determine the operating state of the entire security system. For example, if the ignition switch of the vehicle is in the normal ON position, and the vehicle is coasting along a road, the security system ignores some of its sensing inputs such as the vehicle body vibrating sensor input.

The radio receiver 10 is used as part of a wireless link, which carries vehicle operator instructions to the vehicle security system. On most occasions, the wireless link is established via electromagnetic signals transmitted from a radio transmitter 12 included in a remote control unit of the vehicle security system. The owner of the vehicle normally carries this remote control unit with, for example, a main ignition switch key of the vehicle.

The DIP switch array 23 in FIG. 1, serves to provide means to program the security functions for the vehicle. One of the conventional programming methods employed for setting up functions provided by a vehicle security system includes setting the ON/OFF states of switches in such a DIP switch array. This DIP switch array is normally installed on the electronic printed circuit board (PCB) of the security device. The block diagram of FIG. 1 schematically illustrates one such system employing this programming scheme. Physical access to the system circuit module is necessary when the vehicle security installed. Physical access to the DIP switch array is also necessary for each subsequent function adjustment or security device reprogramming. The security system module need be removed from the vehicle in order to gain access to the DIP switch array. The circuit module must also be opened to expose the DIP switches to a service technician, or the user, to perform the function adjustment and/or the reprogramming.

Since vehicle security systems are designed to provide ever more complicated functions, using DIP switches to set up some, if not all, of these security functions has become a task that cannot be considered easy or straightforward. Adjustment setting in a large array of DIP switches is not an easy task, because each individual switch has to be identified before a setting can be made. Such jobs normally have to be performed by trained service personnel.

If DIP switches are to be used for function setting in security systems with complicated functions, a large number of DIP switches must be used. As a result, system PCB's have to provide a significant amount of valuable board space for these DIP switches. The cost of this increased PCB size and the cost of the DIP switches increase the costs of the vehicle security system hardware.

FIG. 2 illustrates a conventional vehicle security system in which a limited number of programming control switches and a wireless transmission are used for programming the security functions. This approach is used to employ the smallest possible number of electrical switches for security system function adjustment and/or reprogramming. It is used in conjunction with a step-by-step procedure. This method is designed to circumvent the necessity of using a large array of switches for the setting of every individual function provided by the vehicle security device.

Normally, by setting the vehicle security system of FIG. 2 to its program mode by properly setting the program switch 24, a user can program all the functions by pressing a small number of control switches on a remote control unit. The remote control unit used for such programming is frequently the unit used for the normal operation of the security system. The design of the entire vehicle security system allows the normal remote control unit to become the programming unit automatically when the system module is set to the program mode.

FIG. 3 shows an example of a conventional arrangement for implementing a programming scheme that includes the use of a external computer. The system illustrated in the block diagram of FIG. 3 incorporates a host computer system 37 that serves to control the function-programming procedure in a security system via the wired interface 25. Although this scheme provides better flexibility in the process of function selection and setting, a direct wired connection of the circuit module to the host computer is necessary. Before the connection to the host computer is made, the circuit module of the vehicle security system has to be removed from the vehicle and taken to the location where the host computer resides. On most occasions, only vehicle service shops have the necessary interface between the host computer and the vehicle security system. As a result, the convenience of programming interface is not directly accessible to the end user, that is, the owner of the vehicle.

SUMMARY OF INVENTION

An embodiment of the present invention provides a method and system for programming a base unit set with a remote programmer by downloading at least one user selectable command string from a remote programmer to the base unit via a wireless link, where the remote programmer comprises a remote controller, a memory capable of storing a representation of said at least one user selectable command string; user operable switches that can be used to modify the numeric values stored in the memory; a display, and transmitter that can transmit the command string to the base unit; and a base controller comprising: a microcontroller; and a command memory that holds instructions that cause the controller to determine whether or not a function-programming request code is received, store the user selectable command string in a non-volatile memory, and if the controller is not in the process of function-programming, to determine whether a security event has occurred, and if so, initiate an alarm function.

DETAILED DESCRIPTION

The present invention provides a system for wireless function programming of a vehicle security system. One embodiment of the invention is illustrated in the circuit block diagram of FIG. 4.

Figure 1:
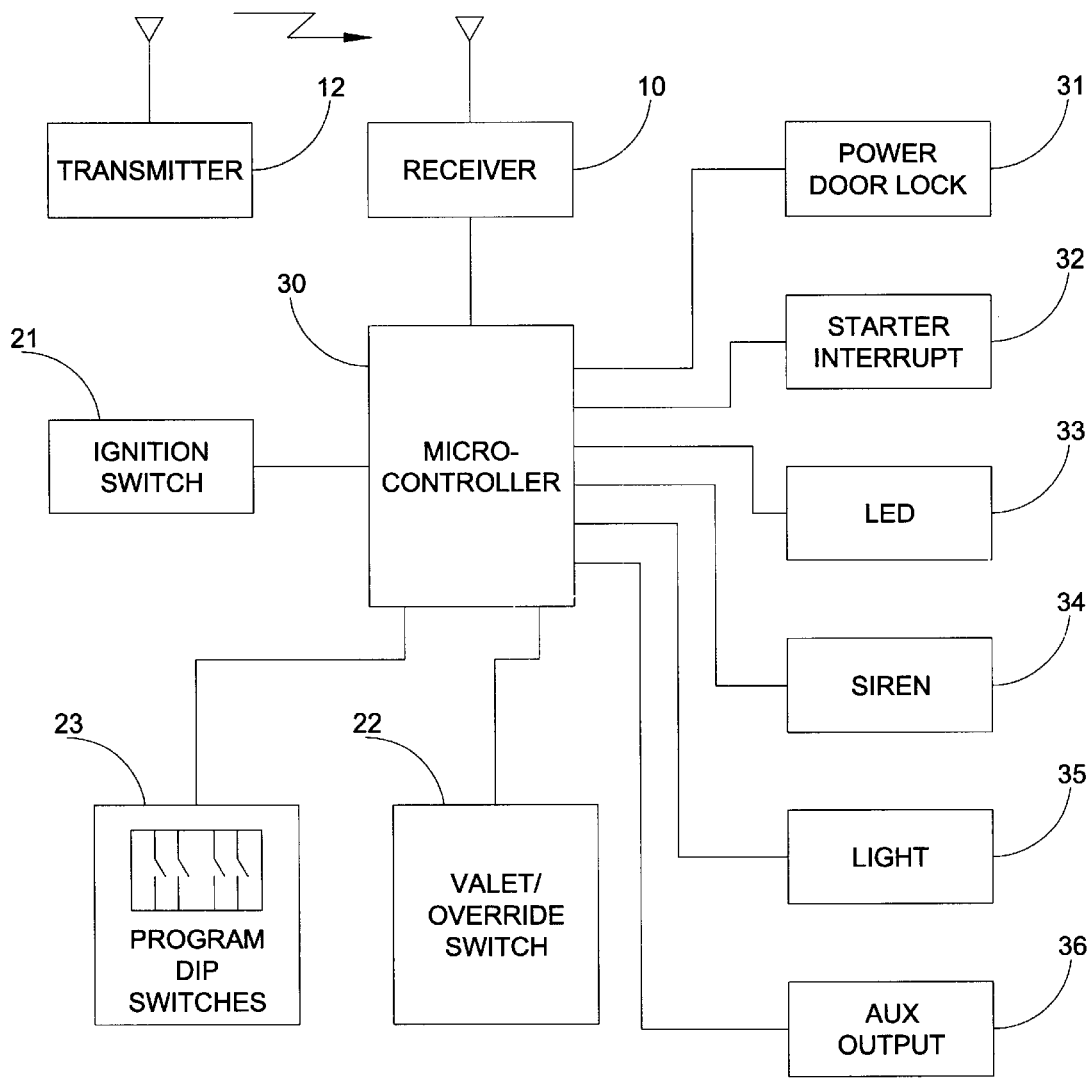
FIG. 1 is a block diagram illustrating a circuit of a prior art vehicle security system employing a DIP switch array for programming security functions.
Figure 2:
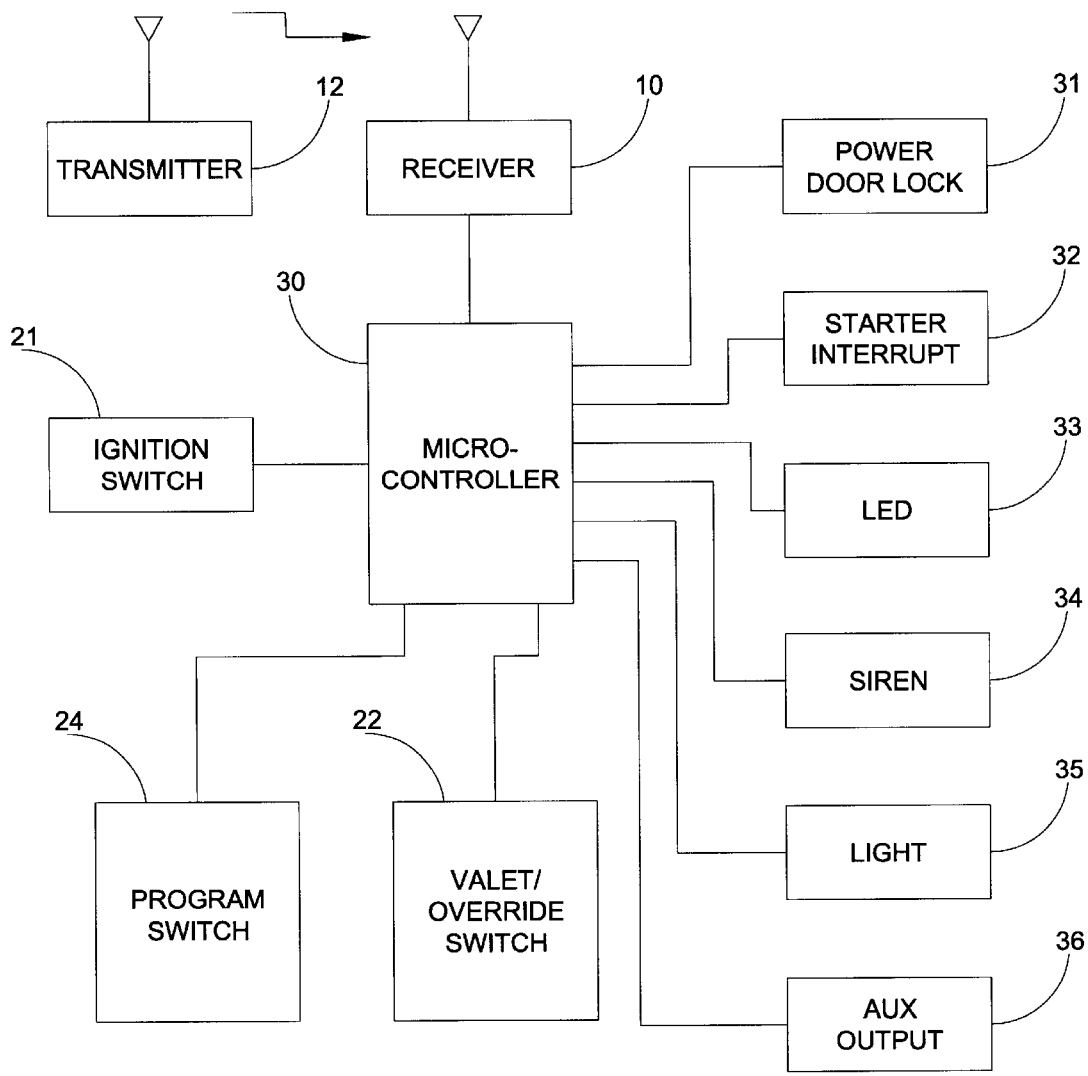
FIG. 2 is a block diagram illustrating a circuit of a prior art vehicle security system employing a step-by-step rotating scheme for programming security functions.
Figure 3:
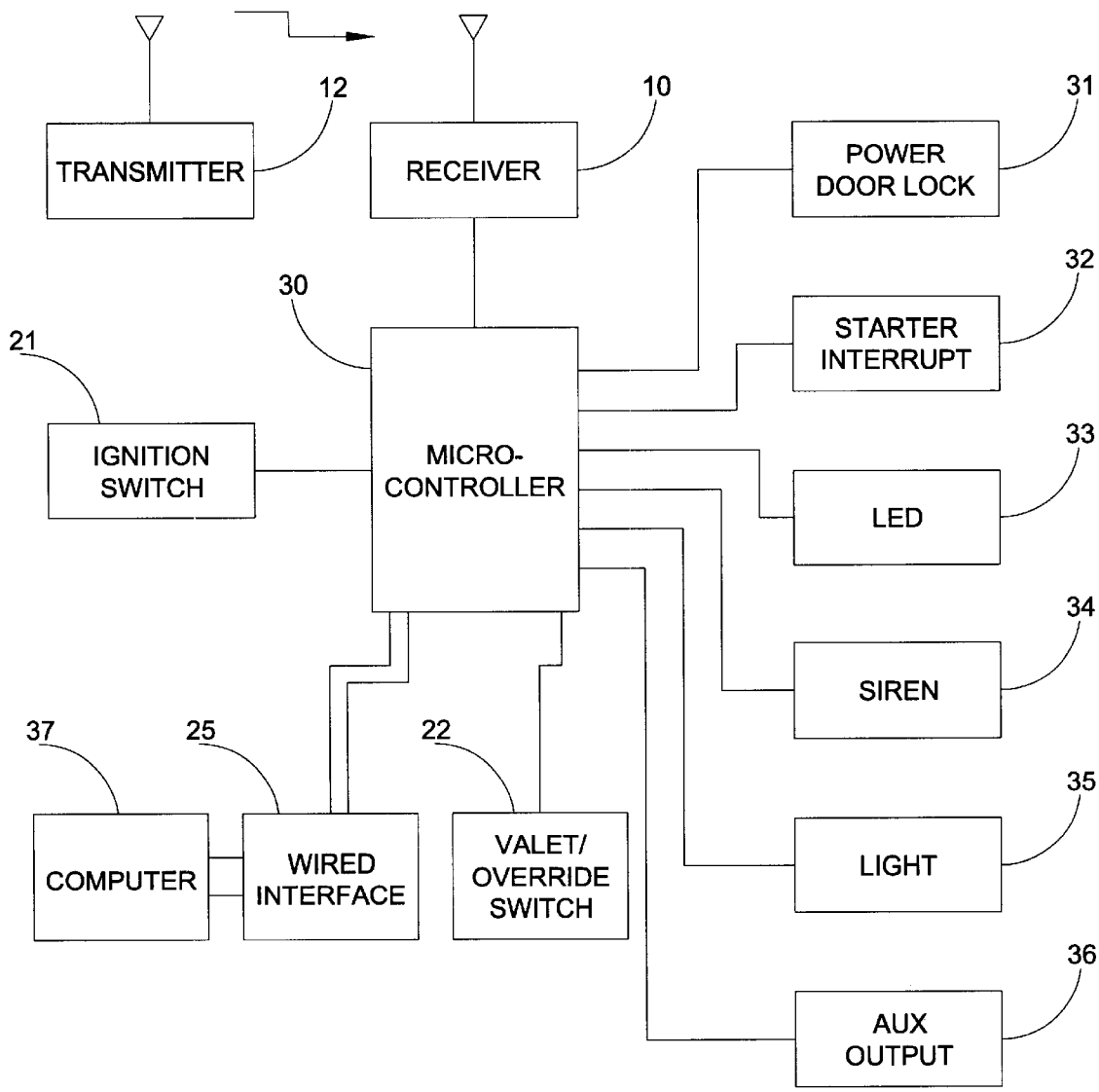
FIG. 3 is a block diagram illustrating a circuit of a prior art vehicle security system employing a wired host computer system for programming security functions.
Figure 4:
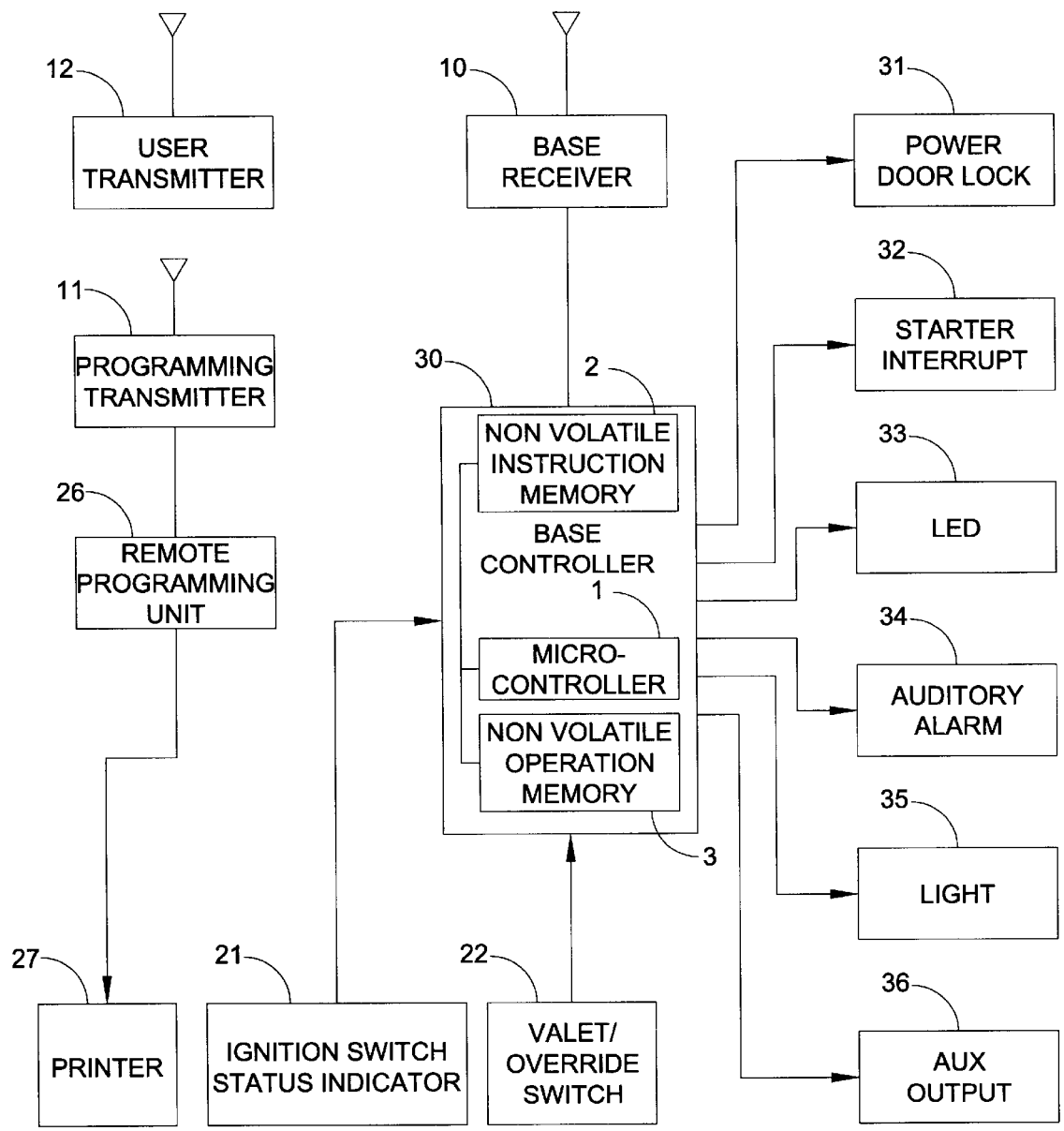
FIGS. 4 & 4A are block diagrams of the circuit configuration of a vehicle security system that employs wireless function-programming.

FIG. 4 illustrates a vehicle security system that includes a base controller 30 that controls security functions for a vehicle. The base controller includes a microcontroller 1, capable of following a predetermined arrangement of steps. These steps can include decision steps that affect which steps are taken subsequently. As is well known in the art, such a device can be implemented with a commercially available microcontroller, a general-purpose microprocessor, an imbedded microprocessor, state machine or logic array. The base controller also includes a non-volatile instruction memory 2 that holds a sequence of commands or steps that the microcontroller follows. Certain microcontrollers have such memory included within their package. One skilled in the art will recognize that separate memory devices could also be used, such as an Erasable Programmable Read Only Memory (EPROM). In the case of a microcontroller embodied in a logic array or state machine, such devices could be constructed in a way such that the desired instructions are inherent in the design of the device instead of embodied in a separate, identifiable memory.

When installed, the base controller is connected to controllers, sensors and indicators, and actuators in a vehicle. In the embodiment shown in FIG. 4, it is connected to a power door-lock unit 31; a starter interrupt 32 that can prevent the vehicle from being started; one or more light-emitting diodes (LED) 33; an auditory alarm 34, such as a siren; a vehicle light signaling control 35; and an auxiliary output 36.

In one embodiment, a LED is installed on a vehicle dashboard and displays different lighting patterns indicating to the driver information regarding the system status. If a security violation event is triggered from outside the vehicle after the system is armed, the auditory alarm is activated in different warning sound schemes, and the vehicle light signaling control causes the vehicle head lights and signal lights to turn on and off in different signaling patterns.

Figure 4A:
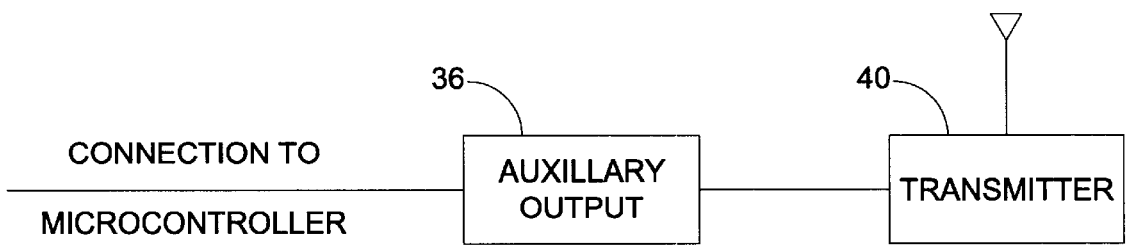

In one embodiment the auxiliary output provides a way to activate other devices that would be useful in a security violation event. As shown in FIG. 4A, radio transmitter 40 onboard the vehicle, can send predefined radio signals useful for tracking the location of the vehicle.

The system outlined in FIG. 4 further includes an ignition switch status indicator 21, and a valet/override switch 22. The ignition switch status is relayed from the indicator 21 to the base controller 30 to determine the operating state of the entire security system. When the ignition switch of the vehicle is in the normal ON position, and the vehicle is being driven along a road, a status signal from the indicator 21 allows the security system to properly control the entire security system. The system may be instructed to ignore some of its sensing inputs, for example, such as a vehicle body vibrating sensor input (not shown), since the vehicle is being driven. The valet/override switch 22 status is relayed to the base controller 30 to determine the mode of the alarm. This switch provides a way of instructing the alarm not to arm passively.

The alarm system can be adjusted to use either the auditory alarm or the lights, or both, to warn of an attempted or achieved intrusion into the guarded vehicle. The behavior of the system's functions are determined by a set of values stored in the operation memory 3, which is a non-volatile programmable memory connected to the microcontroller. These values represent a string of commands selected by the user to control the alarm system. An example of such a memory is an electrically erasable programmable read only memory (EEPROM). The operation memory could also be implemented by using a typical random access memory, with a semi-permanent power supply, such as a battery within the base controller, or a constant connection to the starter battery of the vehicle. In one embodiment, the instruction memory 2 and operation memory 3 are embodied in the same device, such as two separate sectors of a single Flash EPROM that could be independently programmed.

The base controller is also connected to a radio receiver, base receiver 10. The base receiver is used to complete a wireless link to receive operator instructions for normal operation of the security system as well as those for programming the security functions. As one skilled in the art would recognize, the base receiver could be packaged in the same chassis as the base controller.

When the system is under control of the user transmitter 12, a wireless link is established via electromagnetic signals transmitted from the user transmitter. This remote control unit includes a small radio transmitter, and is carried by the owner of the vehicle with, for example, the main ignition switch key of the vehicle. The user transmitter can be used to relay normal use signals to the base controller of the system, such as those regarding intrusion alarm arming, automatic door locking and convenience functions such as vehicle locating.

The remote programming unit 26 in the system is used to generate function-programming signals for the security system. The remote programming unit 26 is connected to programming radio transmitter 11, the circuitry for which is well known in the art. In one embodiment of the invention, printer 27 is connected to the remote programming unit 26. This printer can be used to record the setting of the security functions, in effect becoming a data logger. A storage device, such as a memory with self-incrementing address circuitry could also be used as a data logger. This information can be relayed to the printer at, or not at, the same time the transmission of programming information is underway. As should also be readily understood, the interface to the printer device may optionally meet any of the popular electronics communications equipment standards, such as RS-232C.

Many packaging alternatives exist for this system. The programming transmitter could be packaged in the same package as the remote programming unit, or in a separate chassis. The remote programming unit and transmitter can be packaged with the user transmitter or as a separate unit. Furthermore, a single transmitter can be used to relay function-programming signals and normal use signals to the base controller of the system.

In one embodiment of the invention, the remote programming unit and programming transmitter are embodied in a hand-held, battery operated device. The device contains a microcontroller and instruction memory as described for the base controller. The device also contains a programming memory. The programming memory holds a set of values that describe a possible configuration for the base controller. In one embodiment, this memory is embodied as a random access memory device (RAM). In this embodiment, the microcontroller accesses the RAM with interface signals well known in the art, such as address bus signals, chip select and write enable signals. In this embodiment, the RAM could be placed in a write mode by write-enabling the RAM device. The new values held by the programming memory can be transmitted to the base controller and, loaded into the operation memory of the base controller to dictate the behavior of the base controller's functions. In one embodiment, the new values overwrite the original values (i.e., any values existing just prior to the reprogramming.)

The values in the programming memory can be altered by the user of the remote programming unit. In one embodiment, a memory location is allocated for the "passive arming" feature of a vehicle alarm. A value of 0 stored in that location indicates that passive arming is disabled. A value of 1 stored in that location indicates that passive arming is enabled. A liquid crystal display is used to display the names of the user settable features and the corresponding value for that feature in the programming memory. The meaning of the value could alternately be displayed. The word "enabled" could be displayed next to "passive arming" on the display, for example, if the value in the passive arming location of the programming memory is 1.

In one embodiment, buttons on the face of the controller allow the user to scroll up and down through a list of programmable features and their settings as represented in the programming memory. Other buttons are provided to allow the user to alter the value in the programming memory and consequently, the display of the status of that location on the display. A third button is provided to cause the remote programming unit to transmit the data in the program memory to the base controller for storage in the operation memory.

In another embodiment, the remote programming unit is embodied in the combination of software and a personal computer capable of running the software. The computer can be used to serve the functions described for the microcontroller, instruction memory and program memory of the hand-held unit above. The user interface of the personal computer can be used to perform the functions of the display and buttons of the hand-held unit embodiment. An application with a graphical user interface, such as those of programs made for the Microsoft WINDOWS® operating system could be used to make the program easy to use.

Figure 5:
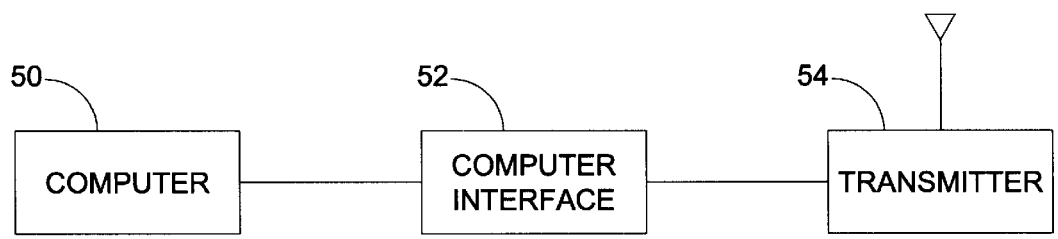
FIG. 5 is a block diagram of an embodiment a remote programming unit attached to a computer.

FIG. 5 shows a block diagram of such an embodiment. A transmitter 54 packaged as a personal computer peripheral can be connected to the computer 50 to perform the function of the programming transmitter 11 of FIG. 4. The computer and transmitter can be connected through the computer interface 52, which can be an RS-232 connection to the computer's serial port, or it can be a connection to the computer's parallel port. Alternately, the transmitter could be placed on a printed circuit card and the computer interface could be embodied by peripheral expansion busses known in the art, such as Industry Standard Architecture (ISA), Extended Industry Standard Architecture (EISA), or Peripheral Component Interconnect (PCI). These embodiments describe a peripheral unit with a minimal amount of circuitry. As is well known in the art, more functionality can be added to the computer peripheral described by placing a programming memory and microcontroller on the peripheral although those functions can be performed by the personal computer. This could have the effect of freeing up the processor of the personal computer for other tasks, or avoiding data overruns in the receive circuitry seen in serial communications when the processor of the personal computer is under a high load.

One skilled in the art would also recognize that the invention could be embodied in by adding an appropriately packaged transmitter to any device with a user interface, processing functionality capable of performing the functions of the microcontroller, instruction memory and program memory of the hand-held unit described above and an expansion port. The transmitter could, for example, be placed on a PC Card, which is a credit card-sized device for use with a lap-top computer with Personal Computer Memory Card International Association (PCMCIA) expansion ports. A similar device could be created for use with a hand held personal assistant such as a PALM PILOT® personal assistant device, by Palm Corporation.

While FIG. 4 shows base receiver 10, in use for receiving commands sent by the user transmitter 12, and from the programming transmitter 11, a person skilled in the art will recognize that separate radio receivers could be used to receive instructions from each of these two sources.

The wireless transmission link between the programming transmitter 11, the base receiver 10 and user transmitter 12 may use any radio frequencies and modulation techniques commonly known in the art for data transmission. Examples of modulation techniques that would work include Pulse Width Modulation (PWM), Pulse Position Modulation (PPM), Phase Shift Keying (PSK), and Frequency Modulation (FM). It should also be noted that the wireless transmissions need not travel directly between the programming transmitter 11, or user transmitter 12 and the base receiver 10. Transmissions may be repeated through pager networks, cell phone networks, or satellite services, such a Global Positioning System (GPS). The wireless link may also be established using electromagnetic signals, which are in the infrared range of frequencies and, which serve the same purposes.

Figure 6:
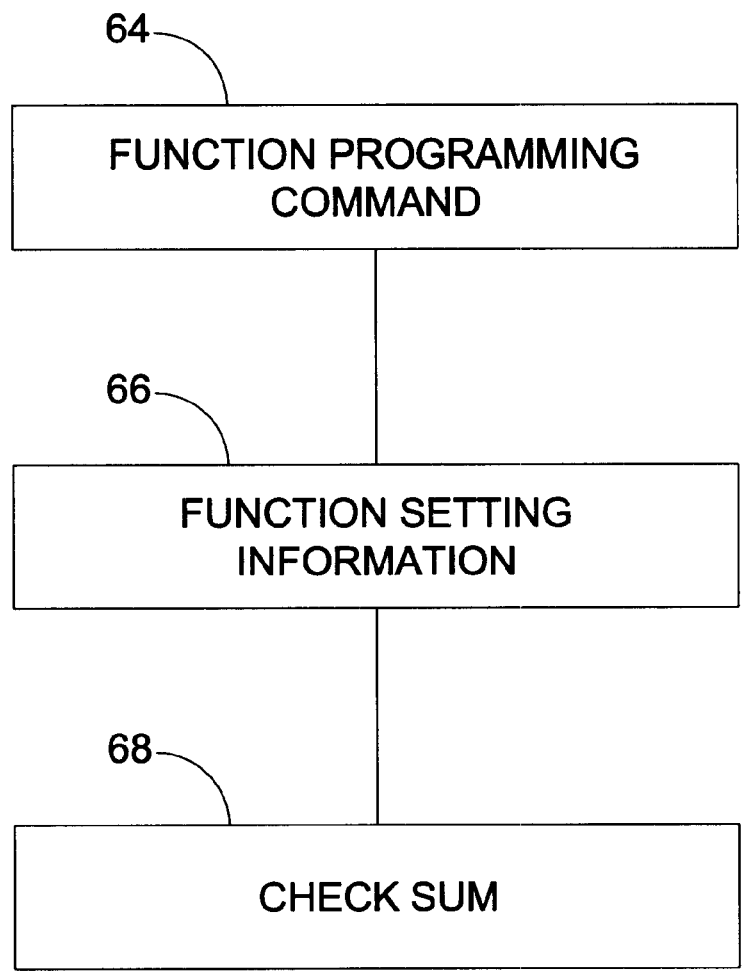
FIG. 6 is a block diagram outlining the format of a wireless signal transmitted by a remote programming unit of the vehicle security system.

FIG. 6 describes a possible format of the data transmitted by remote programming unit 26 of FIG. 4. In one embodiment of the vehicle security system, the data transmitted by the function-programming signals are divided into three types of data. One comprises a function-programming command section 64, there is also a function-setting information section 66, and a check-sum section 68. As persons skilled in the art should be aware, these three sections can be transmitted in any order. This order is determined in advance, however, and the base controller 30 is preset to expect the order that the remote programming unit is preset to send.

The function-programming command section may contain an identification code that is unique to the base controller and its associated remote programming units and user transmitters. This can prevent accidental or intentional reprogramming of the base controller, by remote programming units other than those of the vehicle owner.

In one embodiment, the identification code is changed in a predefined way after each successful transmission for security purposes. This could foil a thief's attempt to receive and store the identification code transmitted by the vehicle owner's remote programming unit and retransmit of the same code at a later time in an effort to alter the settings of the base microcontroller. In another embodiment, the base controller waits a certain length of time after an incorrect identification code is received before it will accept the correct identification code. This hinders malicious attempts to cycle through all possible identification codes in attempt to find the correct one.

In another embodiment, the data sections are sent together in a packet which is encrypted with a code known to all the associated units. Transmissions will only be heeded if they are encoded with the correct code.

Figure 7:
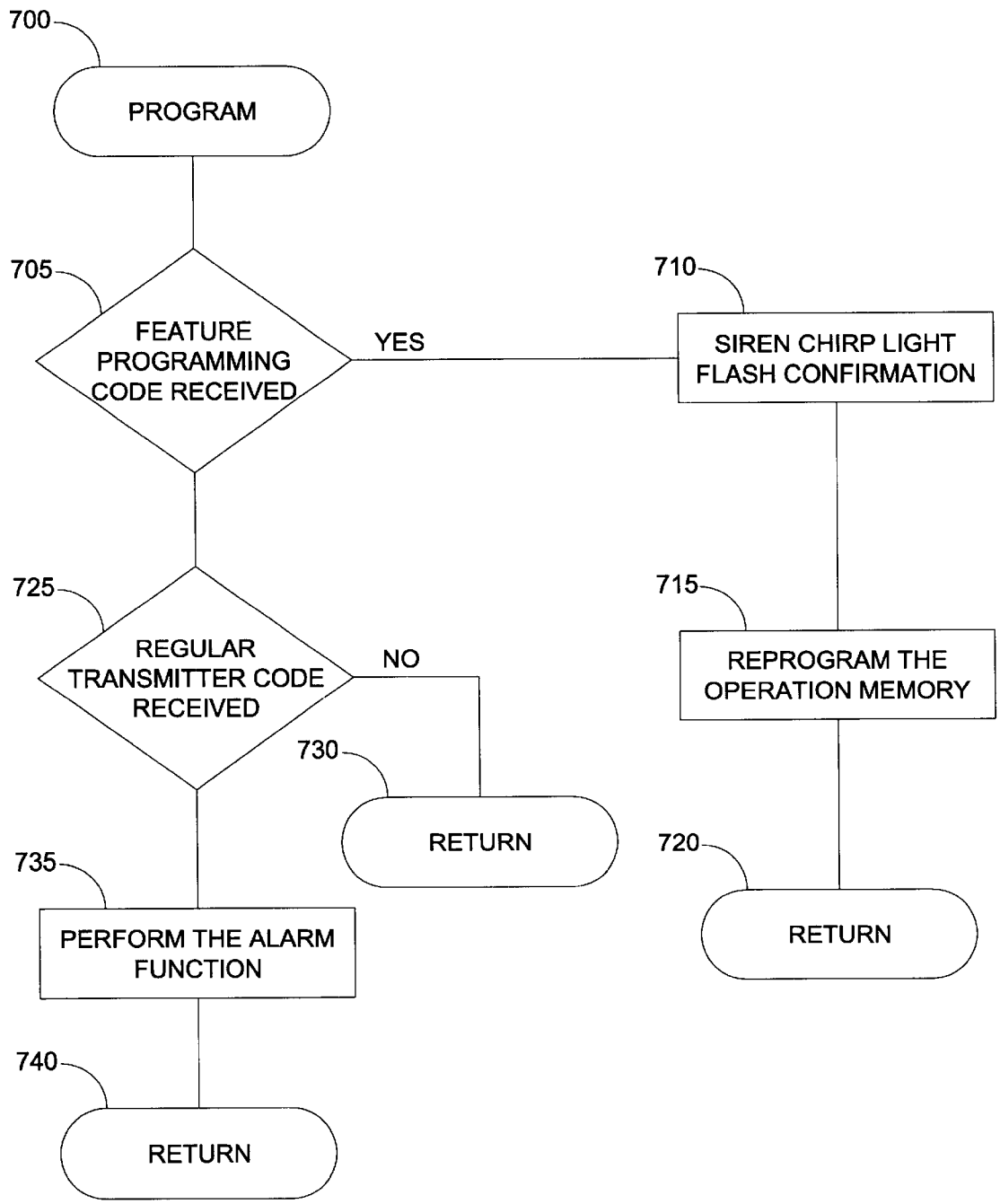
FIG. 7 is a flow diagram illustrating some of the steps executed by a base microcontroller.

FIG. 7 is a flow diagram illustrating steps executed by the microcontroller of base controller 30 of the vehicle security system depicted in FIG. 4. These commands or steps, stored in the base instruction memory, are followed by the base microcontroller in monitoring the activities in the vehicle security system, and also in modifying the contents of operation memory. Essentially, the program can be a recursive routine, starting from the program start step, concluding at a program return step, and then recycling.

For example, the base controller 30 of the system of FIG. 4 starts the routine of FIG. 7 at the start step 700. At step 705, the system determines whether or not a function-programming request code is received. If the system is requested by the user to implement a function-programming operation, the routine continues at step 710, where the auditory alarm can be driven to sound predetermined chirps; and the vehicle lights may also be flashed in predetermined patterns. This signals to the user of the system that the system acknowledges the programming request and is responding accordingly.

At a subsequent step 715, the vehicle security system is substantially programmed based on the received information. The new function settings are effectively stored in the operation memory. With the conclusion of the actual reprogramming of the system, the routine has concluded one program cycle, as indicated by step 720, and program control is returned to step 700 for another cycle of system monitoring operation.

Upon determining that the system feature programming code was not received at step 705, which is a situation of normal system monitoring operation, the routine continues at step 725. At step 725, another decision is made to determine whether or not a security event has occurred. If there is no situation requiring a response, the routine concludes at step 730, where the program control is returned to step 700 for another cycle of system monitoring operation.

If there has been a security event that triggered any of the various system sensors as determined at step 725, the routine proceeds to step 735 for the initiation of the alarm function corresponding to the nature of the triggering event. After the conclusion of the alarm operation, the routine concludes at step 740 and the control returns to the starting step 700 for another cycle of monitoring program execution.

Figure 8:
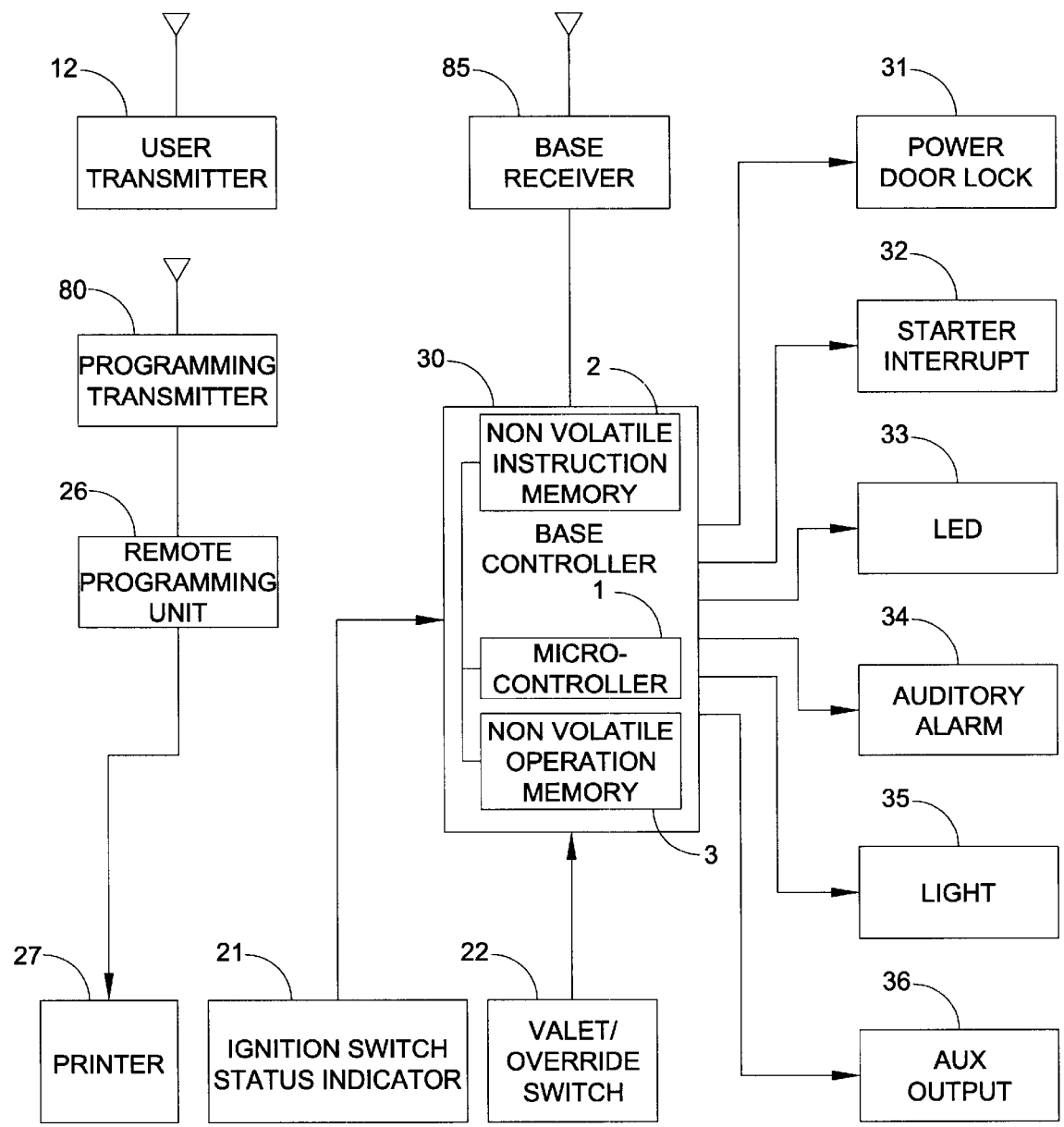
FIG. 8 is a block diagram of the circuit configuration of a vehicle security system that employs two-way wireless function-programming.

FIG. 8. shows another embodiment of the invention. This embodiment is similar to the embodiment shown in FIG. 4. A programming transceiver 80, however, is substituted for the programming transmitter 11 of FIG. 4. A base transceiver 85 is also substituted for the base receiver 10 of FIG. 4. In this embodiment, the user can initiate a program read request command. This could be initiated by pressing a dedicated button on the face of the hand-held embodiment of the remote programming unit 26, for example.

The instructions in the instruction memory of the remote programming unit are programmed so that user initiation of a program read request command causes the microcontroller of the remote programming unit to send a program read request signal to the programming transceiver. This causes a program read request signal to be transmitted by the programming transceiver. This signal can be sent in a multi-section transmission, or encrypted packet, as described in relation to FIG. 6.

When base controller 30 receives a program read request signal, it sends data from operation memory 3 to base transceiver 85 for transmission. This data can be sent in a multi-section transmission, or encrypted packet, as described in relation to FIG. 6. This data is received by programming transceiver 80, and passed to remote programming unit 26. There, it is stored in the programming memory of the remote program unit, for display, manipulation and transmission as described above. In one embodiment, the data received overwrites the data that had previously occupied the programming memory. In another embodiment, the remote programming unit contains a separate program receive memory where incoming data can be stored. This memory could be embodied as a device separate from the device that embodies the programming memory. It could also be embodied in the same physical device as the programming memory, but at addresses other than those used for the programming memory. Data in the program receive memory can later be manipulated by the microcontroller in the base unit and transferred to the programming memory for transmission. When the remote programming unit is embodied in a personal computer, configuration data received by the programming transceiver can be stored in a file on the hard drive of the computer or any other persistence mechanism. Data stored in this way could later be recalled, modified and loaded into the programming memory of the remote programming unit.

The present invention has been described with respect to particular embodiments thereof, and numerous modifications can be made which are within the scope of the invention as set forth in the claims.

We claim:

1. An apparatus for downloading at least one user selectable command string from a remote programmer to a base unit via a wireless link, said apparatus comprising:
   a remote programmer comprising:
      a remote controller;
      a programming memory connected to said remote controller, capable of storing a representation of said at least one command string; and
      an electromagnetic signal transmitter connected to the programming memory, the transmitter capable of transmitting said command string; and
   a base controller comprising:
      a microcontroller;
      a non-volatile operation memory; and
      a non-volatile instruction memory connected to the microcontroller holding instructions that control the operation of the microcontroller, including instructions to:
         a) determine whether or not a function-programming request code is received,
         b) store the command string in said non-volatile operation memory,
         c) determine whether a security event has occurred in a default system monitoring operation if the function-programming request code is not received, and
         d) initiate an alarm function in response to a determination that a security event has occurred.

2. The apparatus of claim 1, further comprising a display, on which a representation of at least part of the command string is displayed.

3. The apparatus of claim 2, wherein said display comprises a graphical user interface.

4. The apparatus of claim 1, wherein said non-volatile instruction memory of said microcontroller further contains an instruction to: generate at least one of a visual and audible feedback signal upon receipt of the command string.

5. The apparatus of claim 1, wherein said microcontroller is a part of a vehicle security system, the command string determining the configuration of the features of the vehicle security system.

6. The apparatus of claim 1, wherein said microcontroller is a part of a keyless entry system.

7. The apparatus of claim 1, wherein said microcontroller is a part of a user convenience system.

8. The apparatus of claim 1, wherein said microcontroller is a part of a vehicle security system, said microcontroller controlling a starter interrupter and at least one of a visual and audible feedback signal produced by a light and an auditory alarm device.

9. The apparatus of claim 1, wherein said remote programmer further comprises:
   a communication interface connected to said remote controller; and
   a printer connected to said communication interface, allowing the printer to print at least one the command string.

10. The apparatus of claim 1, wherein said remote programmer further comprises:
    a communication interface connected to said remote controller; and
    a data logger connected to said communication interface to record at least one said command string.

11. The apparatus of claim 1, wherein said remote programmer further comprises:
    an output port connected to said remote controller, capable of activating a auxiliary device on a specified condition.

12. The apparatus of claim 1, further comprising a plurality of user operable switches connected to said remote controller used to modify the representation.

13. The apparatus of claim 12, wherein at least one of said plurality of user operable switches comprises a key on a keyboard.

14. The apparatus of claim 13, wherein at least one of said plurality of user operable switches comprises a button on a mouse.

15. The apparatus of claim 12, wherein at least one of said plurality of user operable switches is mounted on a dedicated remote programmer unit.

16. The apparatus of claim 1, wherein said function-programming request code contains an identification code.

17. The apparatus of claim 16, wherein said identification code is unique to said base controller, said remote programmer, and said transmitter to prevent unauthorized programming.

18. The apparatus of claim 17 wherein:
    said transmitter is one of a plurality of transmitters, and each of said plurality of transmitters comprises a respective said identification code.

19. The apparatus of claim 17 wherein said identification code is changed in a predetermined way after each successful transmission of the command string.

20. A method of remotely programming a base controller by receiving at least one user selectable command string, said method comprising the steps of:
   a) determining whether or not a function-programming request code is received in said base controller;
   b) programming said user selectable command string in a in a non-volatile operation memory associated with said base controller;
   c) determining whether a security event has occurred in a default system monitoring operation if the function-programming request code is not received by the base controller; and
   d) initiating an alarm function in response to a determination that a security event has occurred.

21. The method of claim 20 further comprising the step of producing at least one of a visual and audible feedback signal acknowledging receipt of said command string.

22. The method of claim 20 wherein said base controller is a part of a vehicle security system.

23. The method of claim 22 further comprising the step of activating a starter interrupter and at least one of a light and an auditory alarm device.

24. The method of claim 20 wherein said base controller is a part of a keyless entry system.

25. The method of claim 20 wherein said base controller is a part of a user convenience system.

26. The method of claim 20 further comprising the step of, via a user interface, altering a second command string stored in a memory associated with a remote programming unit.

27. The method of claim 26, wherein said user interface comprises a keyboard.

28. The method of claim 26, wherein said user interface is embodied in a hand held remote programmer unit.

29. The method of claim 26, wherein said user interface is embodied in a graphical user interface.

30. The method of claim 26 further comprising the step of printing the second command string via a communication interface connected the remote programming unit.

31. The method of claim 26, said user interface comprising:
   at least one remote programming unit, and
   at least one user transmitter;
wherein said function-programming request code further comprises an identification code that is unique to said base controller, said at least one remote programming unit, and said at least one user transmitter to prevent unauthorized programming.

32. The method of claim 31 wherein:
   said user interface is one of a plurality of user interfaces, and
   each said user interface comprises a respective said user transmitter having a respective said identification code.

33. The method of claim 31 further comprising the step of:
   changing the identification code after the step of programming.

34. The method of claim 20 further comprising the steps of, activating a radio transmitter capable of sending at least one vehicle tracking signal via at least one output unit.

35. An apparatus for a vehicle security system in which a set of configuration data is sent via a wireless link from a base unit, said base unit comprising:
   a microcontroller;
   a non-volatile operation memory connected to the microcontroller;
   a non-volatile instruction memory connected to the microcontroller holding instructions that control the operation of the microcontroller;
   an original set of configuration data in the operation memory, at least a portion of which represents the configuration of user selectable functions of the vehicle security system;
   a base transceiver connected to the microcontroller, said non-volatile instruction memory containing at least one instruction to: transmit said original set of configuration data from the base transceiver.

36. The apparatus of claim 35, wherein said non-volatile instruction memory further contains at least one instruction to:
   receive a second set of configuration data, at least a portion of which represents a possible configuration of user selectable functions of the microcontroller.

37. The apparatus of claim 36, wherein said non-volatile instruction memory further contains at least one instruction to:
   store the second set of configuration data in the operation memory.

38. The apparatus of claim 37, wherein the original set of configuration data is overwritten by the second set of configuration data as it is stored in the operation memory.

39. An apparatus for a vehicle security system in which a set of configuration data is received by a remote programming unit via a wireless link, said remote programming unit comprising:
   a remote transceiver, capable of receiving configuration data, at least a portion of which represents the configuration of user selectable functions of a vehicle security system; and
   a memory interface to a program save memory, said interface connected to the remote transceiver and capable of transmitting said configuration data to the program save memory for storage.

40. The apparatus of claim 39, wherein said transceiver, said interface and said program save memory reside in a single chassis.

41. The apparatus of claim 39, wherein said transceiver and said interface reside in a peripheral device for use with a personal computer.

42. The apparatus of claim 41, wherein said interface comprises an RS-232 interface.

43. The apparatus of claim 41, wherein said interface comprises a peripheral expansion bus interface.

44. The apparatus of claim 39, wherein said remote programming unit further comprises a display device that creates a display representing the data contained in the program save memory.

45. The apparatus of claim 44, wherein said display device renders its display on a liquid crystal display.

46. The apparatus of claim 39, wherein said interface is capable of receiving configuration data a program send memory.

47. The apparatus of claim 46, wherein the remote transceiver is capable of transmitting a representation of the configuration data received from the program send memory.

48. The apparatus of claim 46, wherein said remote programming unit further comprises a user input device, wherein said user input device is capable of controlling said interface, wherein said interface produces signals necessary to alter the contents of the program send memory.

49. The apparatus of claim 48, wherein said user input device comprises a keyboard.

50. An apparatus for programming a base unit with a remote programmer, transmit a program read request from said remote programmer to said base unit for data from operation memory, transmit a user selectable command string from said base unit to said remote programmer, using said remote programmer to alter said user selectable command string, transmit said user selectable command string from said remote programmer to said base unit, all said transmits being done via an electromagnetic signal link, wherein the new function settings are stored to dictate the behavior of the base controller's functions, said apparatus comprising:

a remote programmer comprising:
  a microcontroller;
  user operable switches;
  an electromagnetic signal transceiver;
  a display;
  a programming memory; and
  a non-volatile instruction memory connected to the microcontroller holding instructions that control the operation of the microcontroller, including instructions to:
    a) generate a program read request command for said user selectable command string upon user initiation,
    b) receive, said user selectable command string,
    c) store, said user selectable command string in, said programming memory,
    d) to scroll up and down through a list of programmable features and their settings as represented in said programming memory,
    e) display the names of user settable features and the corresponding meaning or value of the feature in said programming memory, on said display,
    f) to alter the value of, said user selectable command string, stored in, said programming memory,
    g) display the names of altered user settable features and the corresponding value or meaning of the feature in said programming memory, on said display,
    h) transmit said user selectable command string to said base unit, and;

a base unit comprising:
  a microcontroller;
  an electromagnetic signal transceiver;
  a non-volatile programmable operation memory; and
  a non-volatile instruction memory connected to the microcontroller holding instructions that control the operation of the microcontroller, including instructions to:
    a) determine whether or not a program read request for said user selectable command string is received,
    b) transmit said user selectable command string upon said read request command,
    c) determine whether or not a function-programming request code is received,
    d) process said user selectable command string,
    e) store said user selectable command string in said base unit's non-volatile operation memory, to dictate the behavior of said base unit's functions,
    f) signal the user that, the system acknowledges the programming request and that said base unit is responding accordingly,
    g) determine whether a security event has occurred in a default system monitoring operation if the function-programming request code is not received, and
    h) initiate an alarm function in response to a determination that a security event has occurred.

51. The apparatus of claim 50, wherein the microcontroller, the user operable switches, the display, the non-volatile instruction memory, and the programming memory of said remote programmer is replaced with one of a personal computer, a personal assistant device, and a laptop computer.

52. The apparatus of claim 51, wherein said microcontroller of said base unit is part of one of a vehicle security system, a keyless entry system, and a user convenience system, and wherein said new function settings are stored in said operation memory to dictate the behavior of said base unit's functions.

53. The apparatus of claim 50, wherein the microcontroller, the electromagnetic signal transceiver, and programming memory of said remote programmer is part of remote programming circuitry that is attached to or installed into one of a personal computer, a personal assistant device, and a laptop computer.

54. The apparatus of claim 53, wherein said microcontroller of said base unit is part of one of a vehicle security system, a keyless entry system, and a user convenience system, and wherein said new function settings are stored in said operation memory to dictate the behavior of said base unit's functions.

55. The apparatus of claim 50, wherein said microcontroller of said base unit is part of one of a vehicle security system, a keyless entry system, and a user convenience system, and wherein said new function settings are stored in said operation memory to dictate the behavior of said base unit's functions.

56. The apparatus of claim 50, wherein the user signals are predetermined chirps and/or lights flashed in predetermined patterns.

57. A method of remotely programming a base unit using a remote programmer, wherein a program read request command is sent by the user from the remote programmer to the base unit, the base unit responds by sending user selectable command string data from non-volatile operation memory to the remote programmer, the data is altered by the user of the remote programmer, and sent back to the base unit for storage in the operation memory to dictate the behavior of the base unit's functions, said method comprising;
  a) the user initiates a program read request command from the remote programmer;
  b) the base unit receives said program read request command and responds by sending said user selectable command string data from the non-volatile operation memory to the remote programmer;
  c) the remote programmer receives said data;
  d) the remote programmer stores said data in remote programmer, programming memory;
  e) the remote programmer displays said data for manipulation;
  f) the user scrolls up and down through said data on the display;
  g) user alters value of said data in said programming memory;
  h) altered data is displayed on said display;
  i) the user then initiates a transmission of said data in said programming memory;
  j) the base unit receives said data;

k) the base unit stores said data in said operation memory to dictate the behavior of said base unit's functions.

58. The method of claim 57 further comprising the step of producing at least one of a visual and audible acknowledgement signal upon receipt of the program read request command.

59. The method of claim 57 further comprising the step of producing at least one of a visual and audible acknowledgement signal upon receipt of the user selectable command string.

60. The method of claim 57 wherein the base unit is a part of a vehicle security system.

61. The method of claim 57 wherein the base unit is a part of a keyless entry system.

62. The method of claim 57 wherein the base unit is a part of a user convenience system.

63. An apparatus for programming a base unit with a remote programmer, transmitting a program read request from said remote programmer to said base unit for data from operation memory, receiving data by a programming transceiver and passing said data to a remote programmer, storing data in the programming memory of said remote programmer, altering the value in said programming memory and a display of the status, and transmitting the data in said programming memory to said base unit for storage in said operation memory, wherein the data is stored to dictate the behavior of the base controller's functions, all transmits and receives being done via an electromagnetic signal link, said remote programmer comprising:

a microcontroller;

user operable switches;

an electromagnetic signal transceiver;

a display;

a programming memory; and a non-volatile instruction memory connected to the microcontroller holding instructions that control the operation of the microcontroller, including instructions to:
  a) transmit a program read request from said remote programmer to said base unit for data from operation memory,
  b) receive data from operation memory,
  c) store data in said programming memory,
  d) scroll up and down through a list of programmable features and their settings as represented in said programming memory,
  e) display the names of the user settable features and the corresponding value or meaning for that feature in said programming memory, on said display,
  f) alter the value in said programming memory,
  g) display the names of the altered user settable features and the corresponding value or meaning for that feature in said programming memory, on said display,
  h) transmit the data in said programming memory to the base unit for storage in the operation memory.

* * * * *